United States Patent
Nagaoka et al.

(10) Patent No.: US 7,940,440 B2
(45) Date of Patent: May 10, 2011

(54) LASER SCANNING DEVICE AND IMAGE FORMING APPARATUS

(75) Inventors: Atsushi Nagaoka, Okazaki (JP); Hideaki Kusano, Toyokawa (JP); Katsuhiro Nanba, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 430 days.

(21) Appl. No.: 12/110,626

(22) Filed: Apr. 28, 2008

(65) Prior Publication Data

US 2008/0316559 A1 Dec. 25, 2008

(30) Foreign Application Priority Data

Jun. 19, 2007 (JP) .................... 2007-161088

(51) Int. Cl.
*G02B 26/08* (2006.01)
(52) U.S. Cl. .................................. 359/198.1
(58) Field of Classification Search .............. 359/198.1, 359/216.1, 819, 820
See application file for complete search history.

(56) References Cited

U.S. PATENT DOCUMENTS

| 6,928,100 | B2 * | 8/2005 | Sato et al. ..................... 359/719 |
| 7,303,290 | B2 * | 12/2007 | Wittenberg et al. .......... 359/719 |
| 2002/0075916 | A1 | 6/2002 | Soto et al. |
| 2003/0071203 | A1 | 4/2003 | Inagaki |

FOREIGN PATENT DOCUMENTS

| JP | 5-136952 A | 6/1993 |
| JP | 5-273483 A | 10/1993 |
| JP | 9-218368 A | 8/1997 |
| JP | 2002-244062 A | 8/2002 |
| JP | 2002-287062 A | 10/2002 |

* cited by examiner

Primary Examiner — Euncha P Cherry
(74) Attorney, Agent, or Firm — Buchanan Ingersoll & Rooney PC

(57) ABSTRACT

A laser scanning device having a light emitting element, an optical element for shaping a laser beam emitted from the light emitting element, a radiator which holds the light emitting element, and a holder to which the radiator and the optical element are fixed. The radiator is planar extending from a flange of the light emitting element. The radiator and the holder are located with a specified space in-between, and resin columns are placed in the specified space. After the radiator holding the light emitting element is positioned in relative the holder in three axial directions, the resin columns are hardened. After the resin columns are hardened, the holder is fixed in a housing.

26 Claims, 12 Drawing Sheets

F I G. 4
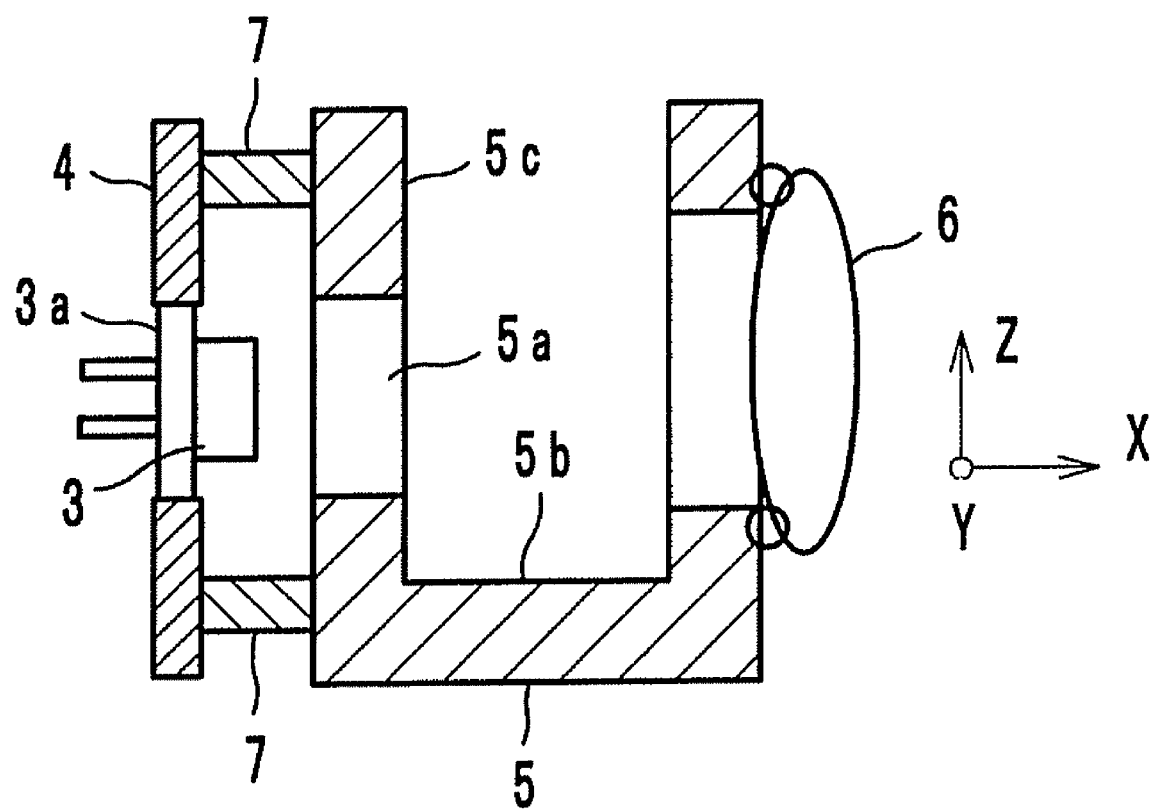

FIG. 5a
FIG. 5b
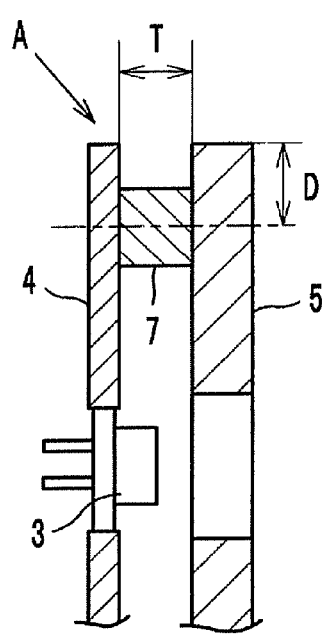
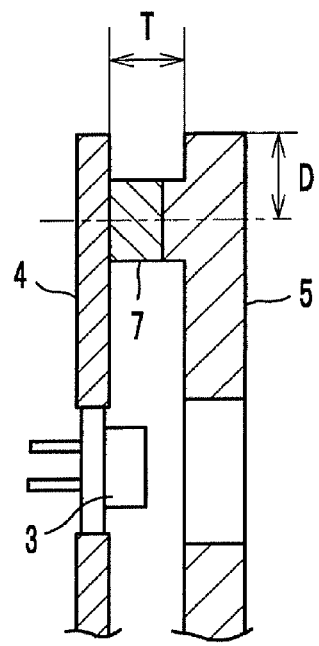
FIG. 6a
FIG. 6b
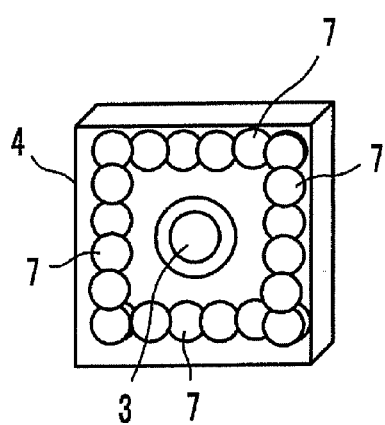
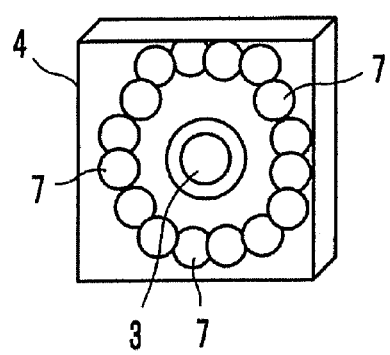

F I G. 2 1 a
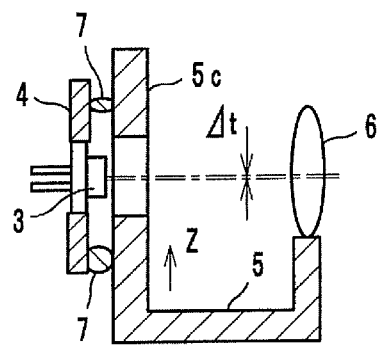
F I G. 2 1 b    F I G. 2 1 c    F I G. 2 1 d
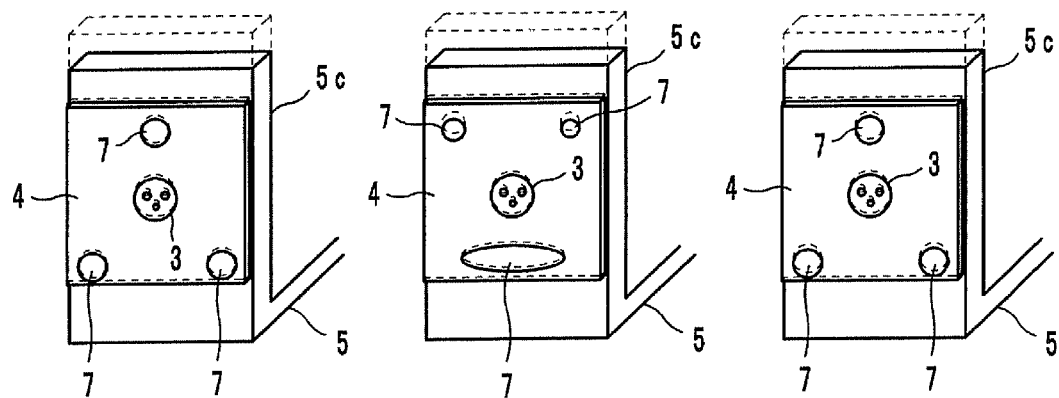

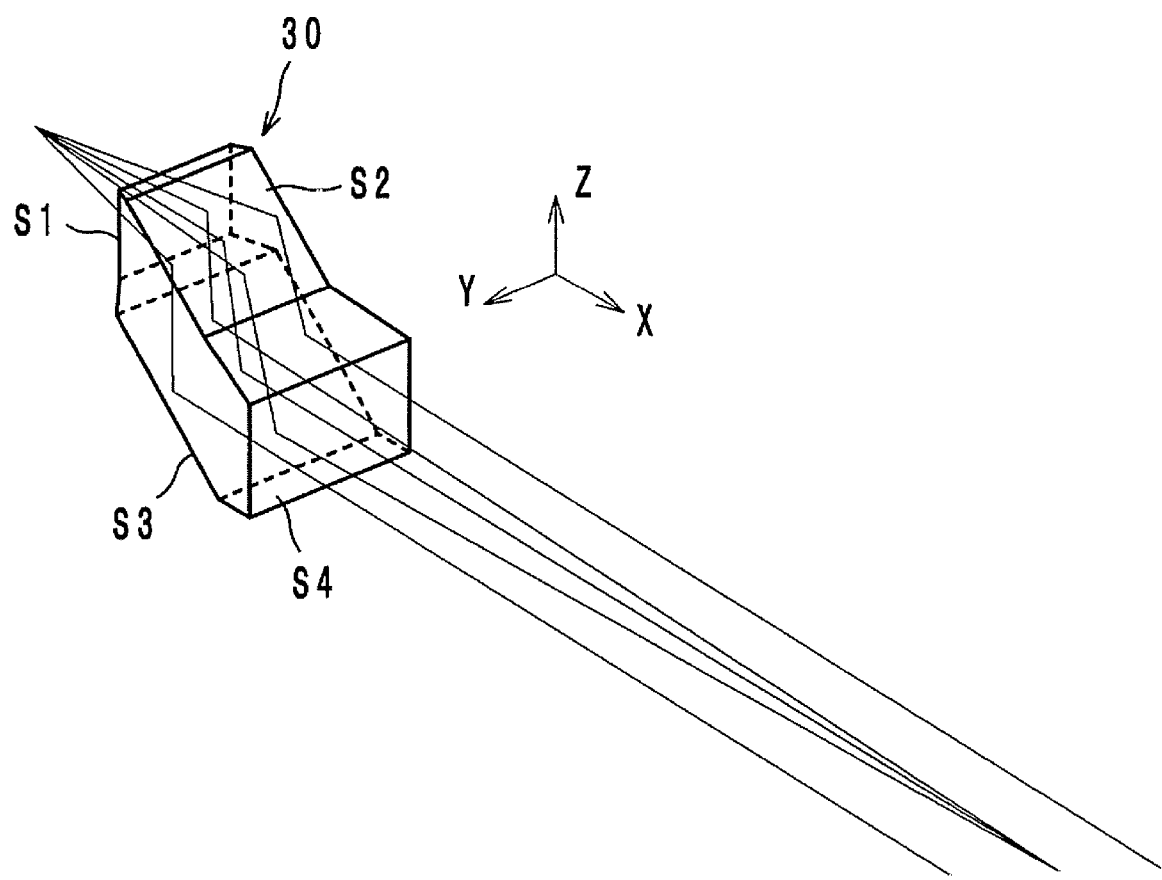
F I G . 2 2

F I G . 2 3
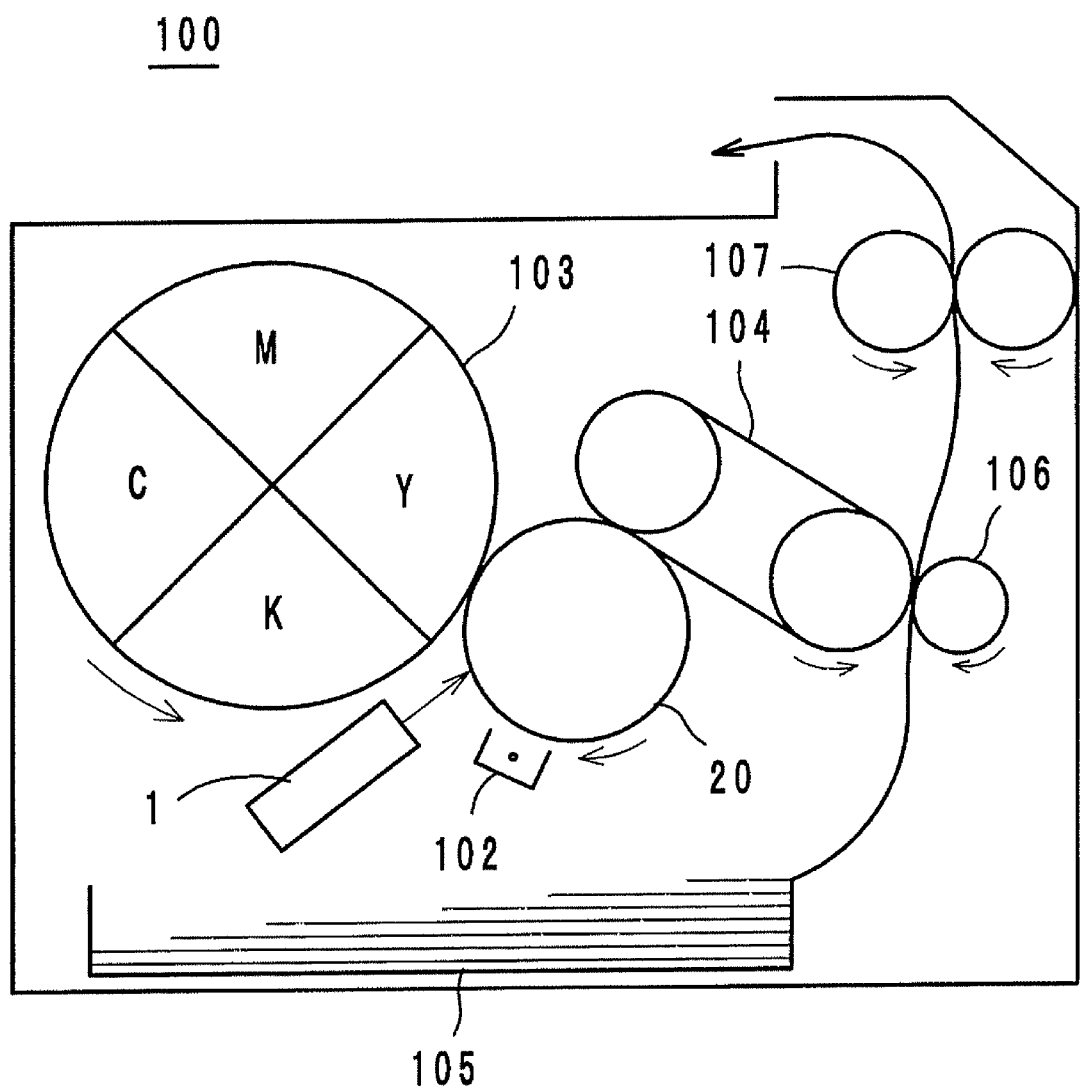

LASER SCANNING DEVICE AND IMAGE FORMING APPARATUS

This application is based on Japanese application No. 2007-161088 filed on Jun. 19, 2007, of which content is incorporated herewith by reference.

BACKGROUND OF THE INVENTION

1. Field of the Invention

The present invention relates to a laser scanning device and an image forming apparatus, and more particularly to a laser scanning device for forming an electrostatic latent image on a photosensitive member in an image forming apparatus such as a copying machine, a printer, a facsimile or the like, and an image forming apparatus provided with the laser scanning device.

2. Description of Related Art

A laser scanning device installed in an image forming apparatus such as a copying machine, a printer, a facsimile or the like has a light source unit comprising a light emitting element (a laser diode), a collimator lens and a cylindrical lens.

JP2002-244062A discloses that a light source unit has a light emitting element and a collimator lens which are fixed to a holder, the light emitting element being press-fitted and the collimator lens being bonded. The collimator lens is positioned against the holder such that the center of the lens matches with the point of light emission and positioned in the direction of optical axis, and thereafter, the collimator lens is fixed to the holder. JP9-218368A discloses that a holder which holds a light emitting element is partly extended in the direction of optical axis and that a collimator lens, an aperture stop and a cylindrical lens are coaxially bonded and fixed to the extended portion of the holder. JP5-136952A and JP5-273483A disclose that an intermediate holder is provided between a radiator holding a light emitting element and a lens holder, that the radiator and the intermediate holder are bonded and fixed together and that the intermediate holder and the lens holder are bonded and fixed together.

According to JP2002-244062A and JP9-218368A, however, since the light emitting element is press-fitted to the holder, it is difficult to adjust the position of the light emitting element in the direction of optical axis. Therefore, the relative positions of the light emitting element and an optical element such as a collimator lens in the direction of optical axis are adjusted by moving the optical element. In the light source unit according to JP2002-244062A, the relative positions of the collimator lens and the holder are adjustable in three directions, namely, the directions for matching of the center of the lens to the point of light emission and the direction of optical axis, and the light source unit is constructed as a unit for emitting a parallel bundle of rays. However, the light source unit does not have a radiator, and there is possibility that the wavelength of light emitted from the light emitting element may change due to an increase in temperature of the light emitting element. In order to avoid this trouble, it is necessary to provide a radiator separately, which increases the number of components and the manufacturing cost. In the structure according to JP9-218368β, the lower ends of the optical elements (the collimator lens and the cylindrical lens) are fixed. Accordingly, the optical elements are adjustable only in the direction of optical axis, and it is difficult to adjust the positions of the optical elements in the vertical direction (sub-scanning direction).

In the light source unit according to JP5-136952A and JP5-273483β, because the intermediate holder is provided between the radiator holding a light emitting element and the lens holder, and the number of components is large. Since the radiator is close fixed to the intermediate holder, the radiator cannot fully perform heat radiation. Also, because there is no space between the radiator and the intermediate holder, light cannot enter between the radiator and the intermediate holder, and it is impossible to use photosetting adhesive to bond the radiator to the intermediate holder. Thus, it takes a long time to bond the radiator and the holder together, and since the bonding is unstable, high accuracy is not guaranteed.

SUMMARY OF THE INVENTION

An object of the present invention is to provide a laser scanning device which has a small number of components, which has a good heat radiating effect and wherein position adjustments of optical elements for matching with the point of light emission and in the direction of optical axis are possible, and an image forming apparatus provided with the laser scanning device.

In order to attain the object, a first aspect of the present invention provides a laser scanning device comprising: a light emitting element; an optical element for shaping a light beam emitted from the light emitting element; a radiator which holds the light emitting element; a holder to which the radiator and the optical element are fixed; a deflector for deflecting the light beam which has passed through the optical element; and a housing in which the radiator, the holder and the deflector are fixed. In the laser scanning device, the radiator is substantially planar extending from a flange of the light emitting element. The radiator and the holder which are located with a space in-between are connected to each other via a resin column placed in the space, and the resin column is hardened after the radiator holding the light emitting device is positioned in relative the holder. Then, after the resin column is hardened, the holder is positioned and fixed in the housing.

A second aspect of the present invention provides an image forming apparatus comprising a laser scanning device comprising: a light emitting element; an optical element for shaping a light beam emitted from the light emitting element; a radiator which holds the light emitting element; a holder to which the radiator and the optical element are fixed; a deflector for deflecting the light beam which has passed through the optical element; and a housing in which the radiator, the holder and the deflector are fixed. In the laser scanning device of the image forming apparatus, the radiator is substantially planar extending from a flange of the light emitting element. The radiator and the holder which are located with a space in-between are connected to each other via a resin column placed in the space, and the resin column is hardened after the radiator holding the light emitting device is positioned in relative the holder. Then, after the resin column is hardened, the holder is positioned and fixed in the housing.

BRIEF DESCRIPTION OF THE DRAWINGS

This and other objects and features of the present invention will be apparent from the following description with reference to the accompanying drawings, in which:

FIG. 4 is a vertical section of another exemplary light source unit;

FIGS. 5a and 5b are sectional views showing the positional relationship between the radiator and the holder;

FIGS. 6a and 6b are perspective views showing a first and a second exemplary arrangement of resin columns;

FIGS. 21a-21d show displacements of an optical axis with an increase in temperature in other models of the light source unit, FIG. 21a being a vertical section of a second, a third and a fourth models, FIG. 21b being a perspective view of the second model, FIG. 21c being a perspective view of the third model and FIG. 21d being a perspective view of the fourth model;

FIG. 22 is a perspective view of another exemplary converging element; and

FIG. 23 is a schematic view of an image forming apparatus according to an embodiment of the present invention.

DETAILED DESCRIPTION OF THE PREFERRED EMBODIMENTS

A laser scanning device and an image forming apparatus according to an embodiment of the present invention are hereinafter described with reference to the accompanying drawings.

General Structure; See FIGS. 1 and 23

Figure 1:
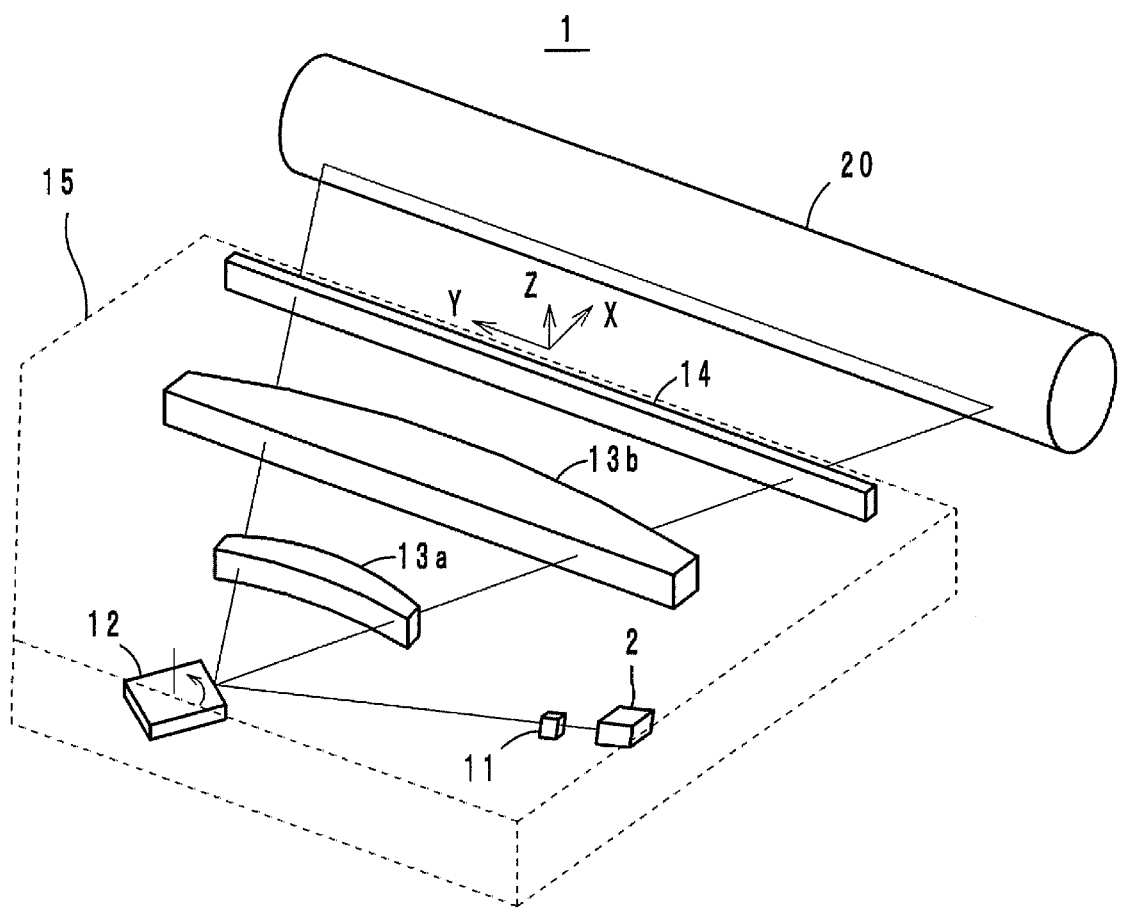
FIG. 1 is a schematic perspective view of a laser scanning device according to an embodiment of the present invention.

FIGS. 1 and 23 show a laser scanning device and an image forming apparatus according to the embodiment of the present invention. The laser scanning device 1 generally comprises a light source unit 2, a cylindrical lens 11, a polygon mirror 12 and scanning lenses 13a and 13b, a cover glass 14 and a housing 15. The laser scanning device 1 is installed in the image forming apparatus 100.

The image forming apparatus 100 is a conventional four-cycle color printer. A charger 102, the laser scanning device 1, a rotary developing device 103 containing toner of four colors (Y, M C and K), an intermediate transfer belt 104, etc. are arranged around a photosensitive drum 20. The laser scanning device 1 forms electrostatic latent images of Y, M C and K sequentially on the photosensitive drum 20, and the developing device 103 develops the electrostatic latent images into respective color images. Thereafter, the color images are transferred onto the intermediate transfer belt 104 (first transfer) sequentially, and thereby, the color images are combined with one another and turned into a composite toner image. The composite toner image is transferred onto a sheet of paper fed from a sheet feeder 105 (second transfer) by an electric field formed by a transfer roller 106. Subsequently, the sheet is fed to a fixing device 107 and is subjected to a heating treatment, and thereby, the toner image is fixed on the sheet. Then, the sheet is ejected onto an upper surface of the printer body.

A beam emitted from the light source unit 2 is substantially a parallel bundle of rays with a substantially circular cross section, and the beam is shaped into a parallel bundle of rays with a linear cross section extending in a main scanning direction Y while passing through a cylindrical lens 11. Then, the beam enters into a polygon mirror 12. The polygon mirror 12 deflects the beam in the main scanning direction Y at a constant angular velocity, and the scanning lenses 13a and 13b correct aberrations. The beam passes through the cover glass 14 and is imaged on the photosensitive drum 20. The photosensitive drum 20 is driven to rotate at a constant velocity, and by the main scanning of the beam and the rotation of the photosensitive drum 20 (sub scanning), a two-dimensional image (electrostatic latent image) is formed.

Light Source Unit; See FIGS. 2-5

Figure 2:
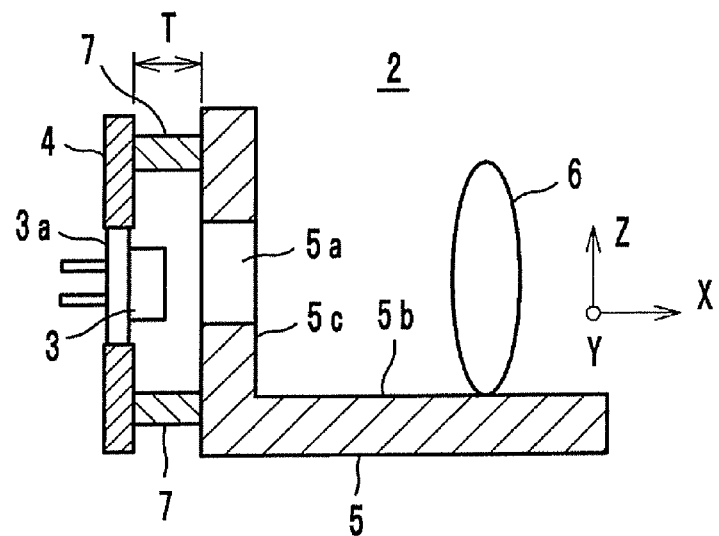
FIG. 2 is a vertical section of an exemplary light source unit.
Figure 3:
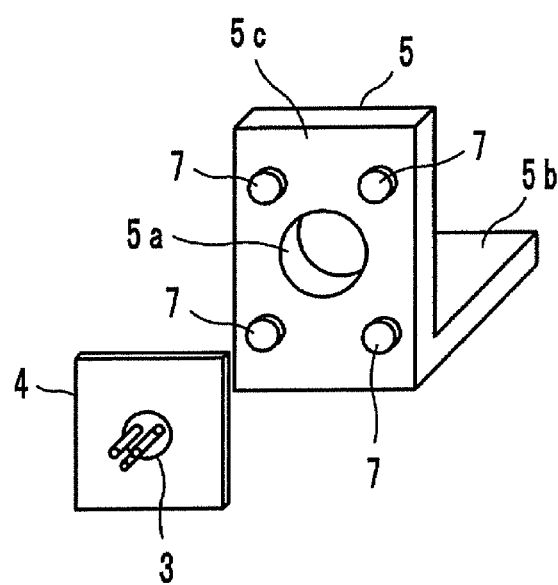
FIG. 3 is a perspective view of a radiator and a holder in the light source unit.

Now, the light source unit 2 is described. The light source unit 2, as shown by FIGS. 2 and 3, comprises a laser diode 3, a radiator 4, a holder 5 and a collimator lens 6. The laser diode 3 is well known.

The radiator 4 is a plate of, for example, stainless steel. The radiator 4 extends from a flange 3a of the laser diode 3 and locks the laser diode 3 at a specified position (in the center of the radiator 4). The holder 5 is made of resin and has a beam transmitting portion 5a. The collimator lens 6 is to shape a divergent bundle of rays emitted from the laser diode 3 into a substantially parallel bundle of rays. The collimator lens 6 is fixed on a horizontal surface 5b of the holder 5 after positioned in three directions (optical axis direction X, main scanning direction Y and sub-scanning direction Z).

The radiator 4 is located in parallel to a vertical surface 5c of the holder 5 with a space T in-between, and resin columns 7 are formed in the space T. The resin columns 7 are made of, for example, photosetting adhesive which is hardened by exposure to ultraviolet rays. The photosetting adhesive is coated on specified positions, and while the photosetting adhesive is unhardened and is under room temperature (25° C.), the position of the laser diode 3 is adjusted in the three directions. Specifically, by using the tensile force of the resin, the position of the laser diode 3 is adjusted such that the center of the laser diode 3 will match with the center of the collimator lens 6, which has been fixed to the holder 5, and is further adjusted in the direction of optical axis. Thereafter, the photosetting adhesive is exposed to light, and thereby, the photosetting adhesive is hardened into the resin columns 7. In this way, the optical source unit 2 can be fabricated accurately. Then, the optical source unit 2 is positioned and fixed in a housing 15.

Adhesive is used generally to bond and fix two things together on a plane. In the structure according to the present embodiment, however, the resin columns 7 serve for spatial adhesion of two things, that is, function as a spacer or a structure for keeping a specified space T between two things (the radiator 4 and the holder 5). The inventors have found out experimentally that the material of the resin columns 7 needs to meet the following conditions so that the resin columns 7 can function as a spacer.

The conditions are: (1) having affinity (adhesiveness) to both the radiator 4 and the holder 5; (2) withstanding the difference between the radiator 4 and the holder 5 in linear expansion, that is, having proper elasticity and having linear expansion between that of the radiator 4 and that of the holder 5, or alternatively having hardness which is equal to or larger than that of the radiator 4 with relatively small elasticity and which is large enough to prevent the holder 5 with relatively large elasticity from being deformed; (3) having viscosity sufficient to keep its shape while being unhardened; and (4) hardly causing irreversible deformation (creep).

The space T between the radiator 4 and the holder 5 prevents heat radiated from the laser diode 3 from being transmitted to the holder 5, and the heat radiates through the radiator 4. If the processing errors of the radiator 4 and the holder 5 are estimated to be at least 0.1 mm, the space T shall be designed to be more than 0.1 mm.

When unhardened resin is filled in the space T to form the resin columns 7, the resin needs to have proper viscosity, which depends on the dimension of the space T and the assembling processes. If the space T is within a range from 0.1 mm to 1.0 mm, the resin needs to have viscosity within a range from 600 mPa·s to 30000 mPa·s under room temperature (25° C.). Further, in order to ease stress caused by hardening of the resin, the resin preferably has a low grass transition temperature. In view of operation under room temperature, however, the grass transition temperature is preferably approximately 60° C. or more. Also, if the glass transition temperature of the resin is too high, peeling may occur under harsh environment. For these reasons, the glass transition temperature of the resin is preferably not more than 110° C.

When ordinary adhesive is coated on a component by overlaying, for example, an overlay with an initial diameter of 3 mm and an initial height of 1 mm will spread over into an overlay with a diameter of 7 mm and a height of 0.5 mm within several seconds, and therefore, it is difficult to form a column of resin by overlaying. If resin with higher viscosity is overlaid so as to maintain the height, the high viscosity will be a bar to control of the amount of coated resin.

The following ways of coating permit the coated resin to maintain its height; (1) after resin is coated, on a component by overlaying, the other component is moved to come in contact with the overlay of resin, and the interval between the two components are widened gradually to the specified space T, which causes tension and maintains connection between the two components via the resin (resin column); (2) after resin is coated on both two components by overlaying, the overlays of resin are caused to come in contact with each other, which causes tension and maintains connection between the two components via the resin (resin column); and (3) while two components are arranged with the specified space T in-between, resin is coated on one of the components at an end such that the coated resin spreads to the other component, whereby the two components are connected with each other. In the case of (3), the resin column 7 is formed between the ends of the components.

The inventors conducted experiments and found out that either of the above ways (1), (2) and (3) permits resin columns to be formed in a wide interval, compared with ways of coating in which the height of an overlay of resin is maintained by the viscosity of resin. Especially, the ways (2) and (3) are effective, and in these ways, by using resin with viscosity within a range from 600 mPa·s to 30000 mPa·s under room temperature (25° C.), a column could be formed in a space of approximately 1.0 mm.

Next, referring to FIG. 4, the position adjustability of the laser diode 3 and the collimator lens 6 which is located immediately after the laser diode 3 in the optical axis direction X is described. The adjustments are executed by moving either the laser diode 3 or the collimator lens 6 in the three directions (optical axis direction X, main scanning direction Y and sub-scanning direction Z). The degree of difficulty in fixing an element to a holder depends on the material and the sensitivity of the element. In fixing an optical element which is made of resin and which is designed to have a plural number of optical functions to a holder, it is difficult to adjust the positions of the optical element in the three directions and to keep the adjusted position on the holder 5. According to the present embodiment, however, the position of the laser diode 3 is adjustable in the directions X, Y and Z, and while the resin columns 7 are unhardened and elastic, the position adjustments of the laser diode 3 and the collimator lens 6 are executed such that light emergent from the collimator lens 6 will be a substantially parallel bundle of rays in the direction Y. Therefore, it is not so difficult to adjust the positions of the laser diode 3 and the collimator lens 6 and to keep the adjusted positions.

As FIGS. 5a and 5b show, preferably, the distance D between the end of the radiator 4 and the center of the resin column 7 and the space T between the radiator 4 and the holder 5 meet a condition, $T \geq 0.2 \times D$. When the resin columns 7 are made of photosetting adhesive, it is necessary to increase the space T in proportion to the distance D so that the photosetting adhesive can be certainly exposed to light and can be hardened completely. For example, when light irradiates the photosensitive adhesive slantwise, for example, in the direction "A" for the convenience of assembly of the light source unit 2, if the distance D is large, the photosensitive adhesive 7 will be hidden in the rear and will not be exposed to the light. Designing the distance D and the space T to meet the condition above is to avoid this trouble. For example, the space T is designed to be 0.1 mm, and the distance D is designed to be 0.5 mm.

The resin column 7 is preferably made of photosetting adhesive of a type which is hardened by exposure to ultraviolet rays. This kind of resin hardens without much delay from the position adjustments of the laser diode and the optical element. Therefore, dislocations after the adjustments can be prevented, and speedy fabrication of the light source 2 becomes possible. Also, an irradiating device of a single color LED type is available for hardening of ultraviolet setting resin, and in this way, it is possible to harden the adhesive without generating heat.

Arrangement and Shape of the Resin Columns; See FIGS. 6-9

Now, the arrangement and the shape of the resin columns 7 are described. The arrangement and the shape of the resin columns 7 need to be designed in consideration for adhesion which is the original function as adhesive, fixation and balance. Further, in consideration for the convenience of assembly and the cost, the resin columns are preferably formed in positions to fix the laser diode 3 and the collimator lens 6 as securely as possible with as little adhesive as possible.

Figure 7A:
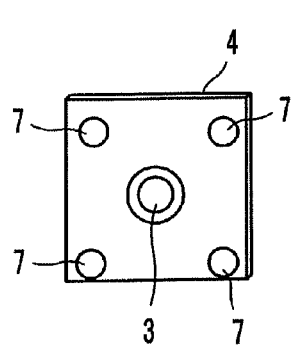
FIGS. 7a, 7b and 7c are perspective views showing a third, a fourth and a fifth exemplary arrangement of resin columns.
Figure 7B:
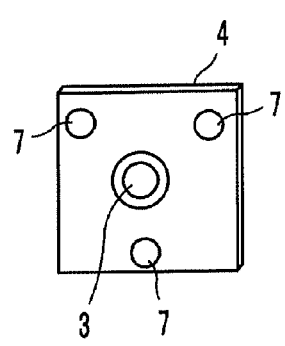
Figure 7C:
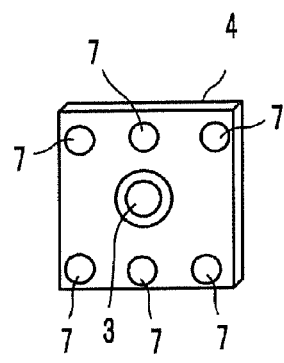

FIGS. 6a and 6b show examples in which the resin columns 7 are arranged in a circle or a rectangle to enclose the laser diode 3. Two or more resin columns 7 are arranged to enclose the laser diode 3, and the resin columns 7 may be almost the same in shape and in size. FIGS. 7a, 7b and 7c show examples of this case, and resin columns 7 of almost the same size are arranged on four spots, three spots and six spots, respectively.

Figure 8A:
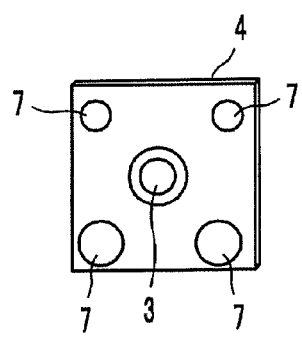
FIGS. 8a, 8b and 8c are perspective views showing a sixth and a seventh and an eighth exemplary arrangement of resin columns.
Figure 8B:
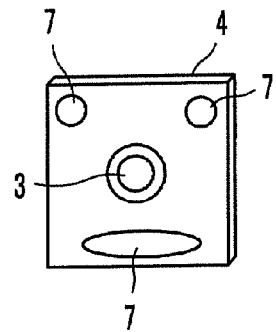
Figure 8C:
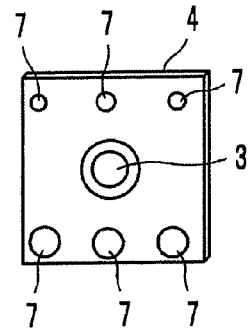

As the amount of resin applied as the resin columns 7 is increasing, the anchor effect of the resin columns 7 becomes strong. Also, due to the limitations to the designs of the radiator 4 and the holder 5, there may be a case that the resin columns 7 cannot be made into the same shape. Therefore, the resin columns 7 may include at least one resin column which is different from the others in shape and in size. FIGS. 8a, 8b and 8c show examples of this case. In the examples shown by FIGS. 8a, 8b and 8c, the amount of resin used for the lower resin column(s) 7 is larger.

Figure 9A:
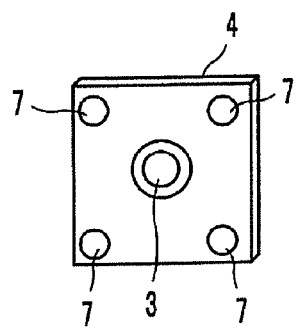
FIGS. 9a and 9b are perspective views showing a ninth and a tenth exemplary arrangement of resin columns.
Figure 9B:
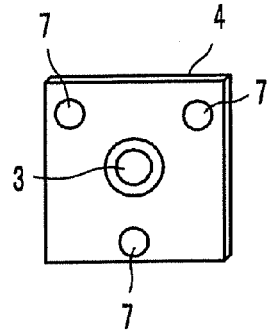

Further, at least one of the resin columns 7 may be made of a material different from the other resin columns. FIGS. 9a and 9b show such examples of this case. In the examples shown in FIGS. 9a and 9b, the material of the upper resin columns 7 and the material of the lower resin column(s) 7 are different from each other.

Structure for Positioning the Resin Columns; See FIGS. 10-18

At least one of the radiator 4 and the holder 5 may have recesses or projections where the resin columns 7 are to be formed, and the recesses may be smaller than the bottoms of the resin columns 7. The recesses will be marks when resin is coated and will prevent the coated resin from dropping. The projections will be marks and will guarantee a large space for an approach of light to the resin.

Figure 10A:
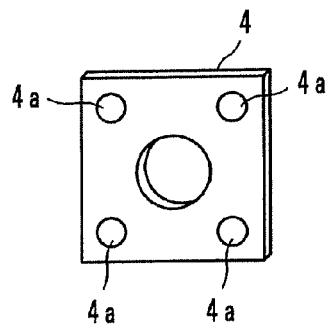
FIGS. 10a and 10b show first exemplary recesses formed in the radiator, FIG. 10a being a perspective view and FIG. 10b being a sectional view.
Figure 10B:
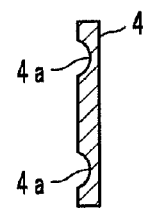
Figure 11A:
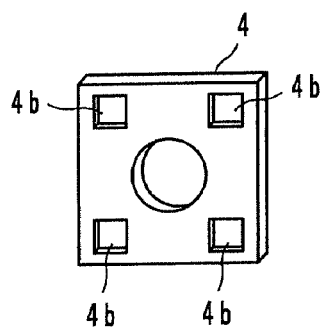
FIGS. 11a and 11b show second exemplary recesses formed in the radiator, FIG. 11a being a perspective view and FIG. 11b being a sectional view.
Figure 11B:
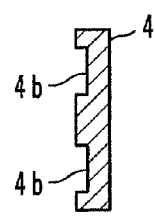
Figure 12A:
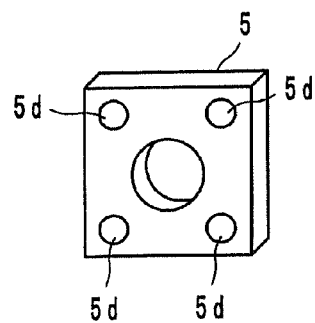
FIGS. 12a and 12b show first exemplary recesses formed in the holder, FIG. 12a being a perspective view and FIG. 12b being a sectional view.
Figure 12B:
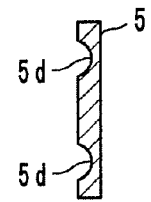
Figure 13A:
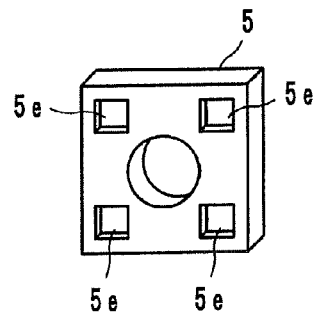
FIGS. 13a and 13b show second exemplary recesses formed in the holder, FIG. 13a being a perspective view and FIG. 13b being a sectional view.
Figure 13B:
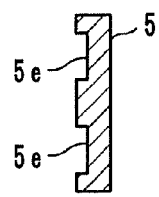
Figure 14A:
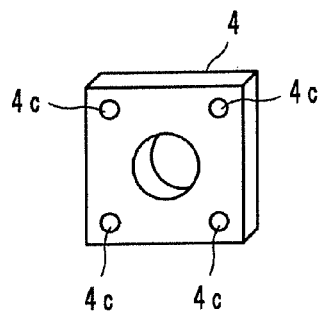
FIGS. 14a and 14b show first exemplary projections formed on the radiator, FIG. 14a being a perspective view and FIG. 14b being a sectional view.
Figure 14B:
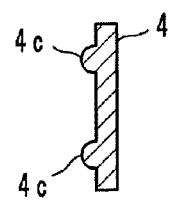
Figure 15A:
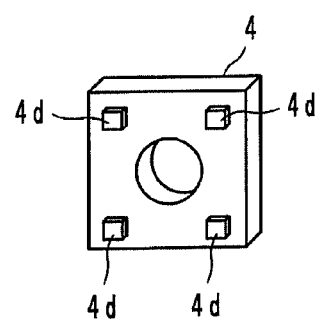
FIGS. 15a and 15b show second exemplary projections formed on the radiator, FIG. 15a being a perspective view and FIG. 15b being a sectional view.
Figure 15B:
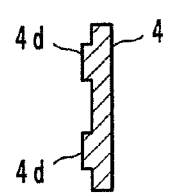
Figure 16A:
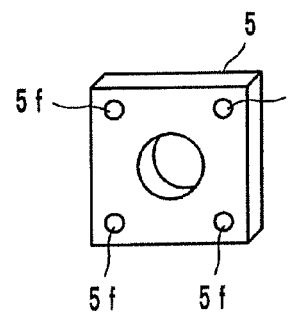
FIGS. 16a and 16b show first exemplary projections formed on the holder, FIG. 16a being a perspective view and FIG. 16b being a sectional view.
Figure 16B:
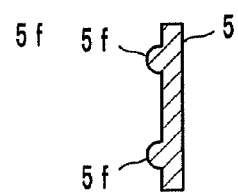
Figure 17A:
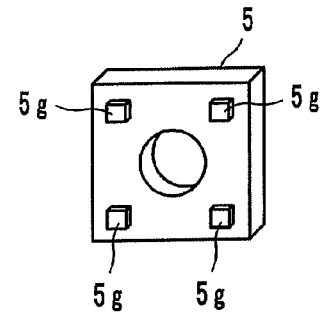
FIGS. 17a and 17b show second exemplary projections formed on the holder, FIG. 17a being a perspective view and FIG. 17b being a sectional view.
Figure 17B:
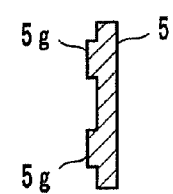
Figure 18A:
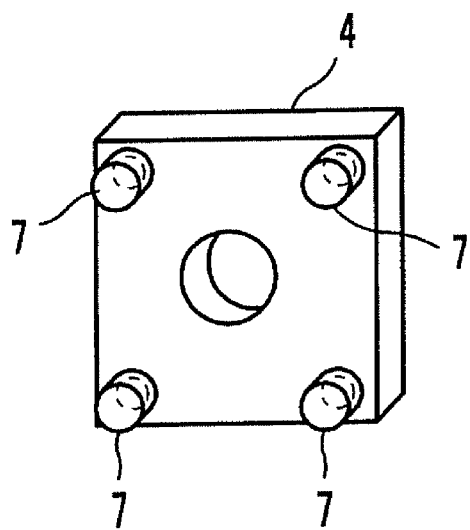
FIGS. 18a and 18b show third exemplary recesses formed in the radiator, FIG. 18a being a perspective view and FIG. 18b being a sectional view.
Figure 18B:
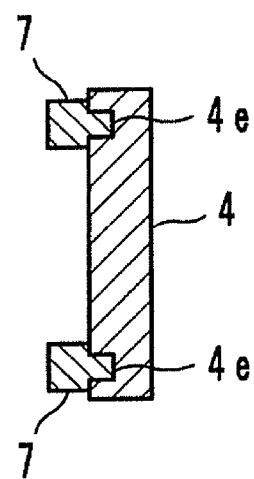

FIGS. 10a and 10b show an example of forming semispherical recesses 4a in the radiator 4. FIGS. 11a and 11b show an example of forming rectangular recesses 4b in the radiator 4. FIGS. 12a and 12b show an example of forming semispherical recesses 5d in the holder 5. FIGS. 13a and 13b show an example of forming rectangular recesses 5e in the holder 5. FIGS. 14a and 14b show an example of forming semispherical projections 4c on the radiator 4. FIGS. 15a and 15b show an example of forming rectangular projections 4d on the radiator 4. FIGS. 16a and 16b show an example of forming semispherical projections 5f on the holder 5. FIGS. 17a and 17b show an example of forming rectangular projections 5g on the holder 5. FIGS. 18a and 18b show an example of forming recesses 4e which are smaller than the bottoms of the resin columns 7 in the radiator 4. These small recesses 4e may be formed in the holder 5, not in the radiator 4.

Displacement of Optical Axis with an Increase in Temperature; See FIGS. 19-21

Next, displacement of the optical axis with an increase in temperature of the light source unit 2 is described. In a first model of the light source unit 2 hereinafter described, as FIGS. 19a and 19b show, the radiator 4 is bonded to a vertical surface 5c of the holder 5 via four resin columns 7 which are arranged diagonally and equidistantly from the laser diode 3.

Figure 19A:
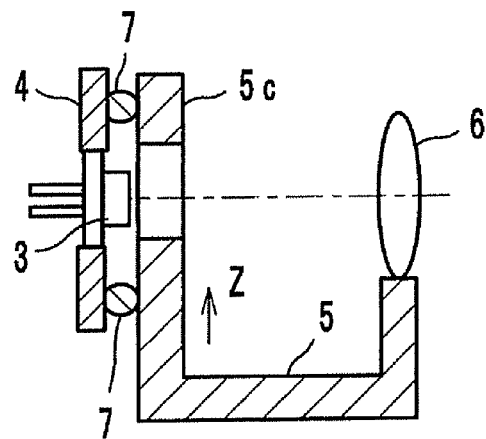
FIGS. 19a and 19b show a first model of the light source unit which is used to examine a displacement of an optical axis with an increase in temperature, FIG. 19a being a vertical section and FIG. 19b being a perspective view.
Figure 19B:
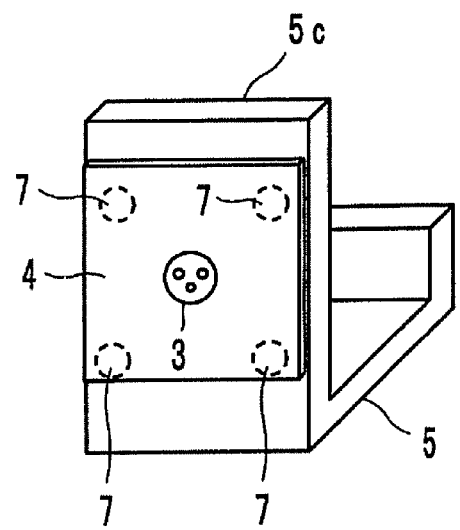
Figure 20A:
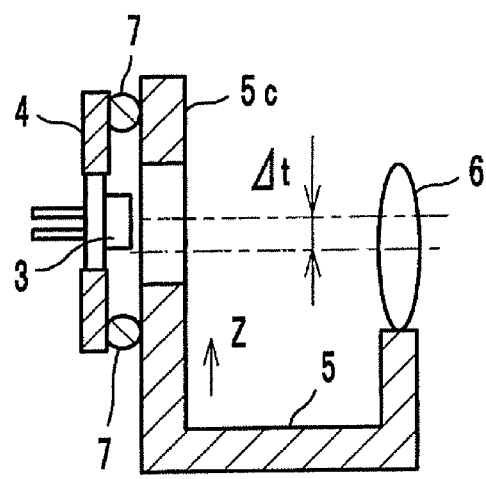
FIGS. 20a and 20b show a displacement of an optical axis with an increase in temperature in the first model, FIG. 20a being a vertical section and FIG. 20b being a perspective view.
Figure 20B:
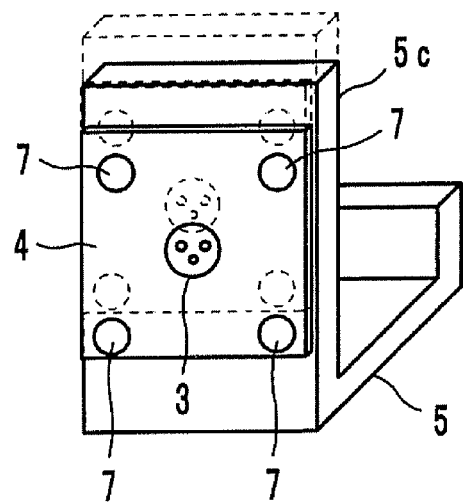

FIGS. 20a and 20b schematically show the light source unit 2 shown by FIGS. 19a and 19b (first model) when the temperature increases. With an increase in temperature, the laser diode 3 shifts in the sub-scanning direction Z due to thermal expansion of the vertical surface 5c of the holder 5. Accordingly, the optical axis of the laser diode 3 is displaced in the sub-scanning direction Z by a distance Δt from the optical axis of the collimator lens 6, of which lower end is bonded to the holder 5. If the coefficients of thermal expansion of the holder 5, the radiator 4 and the collimator lens 6 are 0.00038, 0.00017 and 0.00017 respectively, when the temperature inside the image forming apparatus increases due to operation of the laser scanning device, the displacement Δt will be approximately 2 μm or less. A displacement in this degree is practically allowable.

FIG. 21a shows a case wherein the upper resin column(s) 7 and the lower resin column(s) 7 are different from each other, and FIGS. 21b-21d show specific examples of this case. FIG. 21b shows a second model of the light source unit 2. In the second model, the radiator 4 and the holder 5 are bonded together via one upper resin column 7 and two lower resin columns 7. All the three resin columns 7 are cylinders with the same diameter. FIG. 21c shows a third model of the light source unit 2. In the third model, the radiator 4 and the holder 5 are bonded together via two upper resin columns 7 and one lower resin column 7. The lower resin column 7 is made of a more amount of resin than each of the upper columns 7 and is an oval extending horizontally. FIG. 21d shows a fourth model of the light source unit 2. In the fourth model, the radiator 4 and the holder 5 are bonded together via one upper column 7 and two lower columns 7 as in the second model. In the fourth model, however, the lower two columns 7 are made of resin with a higher Young's modulus than the upper resin column 7. In either of the second model, the third model and the fourth model, as shown by FIG. 21a, the upper resin column(s) 7 prevent(s) the radiator 4 from moving up due to thermal expansion of the holder 5, and the displacement Δt of the optical axis will be smaller than that in the first model.

Another Exemplary Converging Element; See FIG. 22

In the embodiment above, the light source unit 2 comprises a collimator lens 6. In the light source unit 2, however, another converging element may substitute for the collimator lens 6. For example, a DOE (diffractive optical element) 30 as shown by FIG. 22 may be used instead of the collimator lens 6. The DOE 30 turns light emitted from the laser diode 3 into a bundle of rays substantially parallel in the main scanning direction Y and converges the light on a point in close vicinity to a mirror surface of the polygon mirror 12. The DOE 30 is molded monolithically. The DOE 30 has two reflection surfaces S2 and S3 which have no axes of rotation symmetry and two light-transmitting surfaces S1 and S4 which may be diffraction surfaces. By using such a multi-functional optical element, a compact light source unit can be fabricated. The structure of such a DOE is described in United States Patent Application Publication No. 2003/0071203.

SUMMARY OF THE EMBODIMENT

In the laser scanning device according to the embodiment above, the light emitting element is held in the radiator, and the radiator is fixed to the holder for holding the optical element. Therefore, the number of components is small, and the manufacture cost can be reduced. Since the radiator and the holder are located with a space in-between, the radiator has good heat radiation performance. Further, a resin column is placed in the space, and the resin column is hardened after the radiator holding the light emitting device is positioned in relative the holder. In other words, while the resin column has moderate elasticity, the position of the light emitting element is adjusted in the three directions (for matching with the point of light emission and in the direction of optical axis).

In the laser scanning device, the resin column is preferably photosetting adhesive. Because photosetting adhesive hardens speedily, a dislocation of the light emitting element after the position adjustments can be prevented. Also, in order to keep the shape of the resin column in an unhardened state with no peeling and dropping, preferably, the material of the resin column has a glass transition temperature not more than 110° C. and viscosity within a range from 6000 mPa·s to 30000 mPa·s in the unhardened state under room temperature (under a temperature of 25° C.), and the resin column after hardened has a dimension preferably within a range from 0.1 mm to 11.0 mm in the direction of optical axis.

In the laser scanning device, the radiator may be adjustable in relative the holder at least in the optical axis direction, and the optical element may be adjustable in relative the holder at least in a direction perpendicular to the direction of optical axis. In this structure, the resin column is hardened after the radiator and the optical element are adjusted such that the light beam emergent from the optical element is a substantially parallel bundle of rays at least in a main scanning direction.

By fixing the radiator to the holder such that a distance D between an end of the radiator and a center of the resin column and a space T between the radiator and the holder at the end will meet the condition, $T \geq 0.2 \times D$, that is, by designing the space T to be proportional to the distance D, it is possible to irradiate the resin column effectively, which results in stable hardening of the resin.

Two or more resin columns may be arranged to enclose the light emitting element, and the resin columns may be of substantially a same shape and of substantially a same size. Alternatively, the two or more resin columns which are arranged to enclose the light emitting element may include at least one resin column of a different shape and a different size from the other resin columns or may include at least one resin column made of a different material from the other resin columns.

At least one of the radiator and the holder may have a recess or a projection used for positioning of the resin column. Alternatively, at least one of the radiator and the holder may have a recess at a position where the resin column is to be built, and the recess is smaller than a bottom of the resin column. The recess or the projection will be a mark at the time of applying resin and will prevent the resin in an unhardened state from dropping. Further, the recess or the projection increases the area where the resin column stands without enlarging the area where resin is applied, and the bonding strength improves. Also, the recess supplies unhardened resin to the resin column while the resin column is being hardened, and therefore, peeling at the time of hardening of the resin column can be prevented. When the resin column is formed on the projection, the space between the radiator and the holder becomes effectively larger, which widens the approach of light to the resin column for hardening of the resin column.

Other Embodiments

The shapes and the arrangement of the resin columns may be designed arbitrarily. In the laser scanning device, the units other than the light source unit may be structured arbitrarily, and the laser scanning device may be of a multi-beam type which has a plural number of light source units.

Although the present invention has been described in connection with the preferred embodiments above, it is to be noted that various changes and modifications are possible to those who are skilled in the art. Such changes and modifications are to be noted as being within the scope of the present invention.

What is claimed is:

1. A laser scanning device comprising:
    a light emitting element;
    an optical element for shaping a light beam emitted from the light emitting element;
    a radiator which holds the light emitting element;
    a holder to which the optical element is fixed;
    a deflector for deflecting the light beam which has been emitted from the light emitting element and passed through the optical element; and
    a housing in which the radiator, the holder and the deflector are fixed;
    wherein the radiator is substantially a planar plate extending from a flange of the light emitting element; and
    wherein the radiator and the holder are connected to each other via at least one resin column so as to keep a space there-between.

2. A laser scanning device according to claim 1, wherein the optical element is a collimator lens.

3. A laser scanning device according to claim 1, wherein the optical element has both a function as a collimator lens and a function as a cylindrical lens.

4. A laser scanning device according to claim 1, wherein the resin column is photosetting adhesive.

5. A laser scanning device according to claim 1, wherein the resin column has a glass transition temperature not more than 110° C.

6. A laser scanning device according to claim 1,
    wherein the resin column while unhardened has viscosity within a range from 6000 mPa·s to 30000 mPa·s under room temperature; and
    wherein the resin column after hardened has a dimension within a range from 0.1 mm to 1.0 mm in an optical axis direction.

7. A laser scanning device according to claim 1,
    wherein the radiator is adjustable relative to the holder at least in an optical axis direction;
    wherein the optical element is adjustable relative to the holder at least in a direction perpendicular to the optical axis direction; and
    wherein the resin column is hardened after the radiator and the optical element are adjusted such that the light beam emergent from the optical element is a substantially parallel bundle of rays at least in a main scanning direction.

8. A laser scanning device according to claim 1, wherein a condition, $T \geq 0.2 \times D$ is satisfied, in which D is a distance between an end of the radiator and a center of the resin column, and T is a space between the radiator and the holder at the end.

9. A laser scanning device according to claim 1, wherein the resin column is arranged so as to enclose the light emitting element.

10. A laser scanning device according to claim 1, wherein the radiator and the holder are connected to each other via two or more of the resin columns arranged around to the light emitting element, the resin columns being of substantially a same shape and of substantially a same size.

11. A laser scanning device according to claim 1, wherein the radiator and the holder are connected to each other via two or more of the resin columns arranged around the light emitting element, the resin columns including at least one resin column of a different shape and a different size from the other resin columns.

12. A laser scanning device according to claim 1, wherein the radiator and the holder are connected to each other via two or more of the resin columns arranged around the light emitting element, the resin columns including at least one resin column made of a different material from the other resin columns.

13. A laser scanning device according to claim 1, wherein at least one of the radiator and the holder has a recess used for positioning of the resin column.

14. A laser scanning device according to claim 1, wherein at least one of the radiator and the holder has a projection used for positioning of the resin column.

15. A laser scanning device according to claim 1, wherein at least one of the radiator and the holder has a recess used for positioning of the resin column, the recess being smaller than a bottom of the resin column.

16. An image forming apparatus comprising:
    a laser scanning device comprising:
        a light emitting element;
        an optical element for shaping a light beam emitted from the light emitting element;
    a radiator which holds the light emitting element;
        a holder to which the radiator and the optical element is fixed;
        a deflector for deflecting the light beam which has been emitted from the light emitting element and passed through the optical element; and
        a housing in which the radiator, the holder and the deflector are fixed;
        wherein the radiator is substantially a planar plate extending from a flange of the light emitting element;
        wherein the radiator and the holder are connected to each other via at least one resin column so as to keep a space there-between.

17. An image forming apparatus according to claim 16, wherein the resin column has a glass transition temperature not more than 110° C.

18. An image forming apparatus according to claim 16,
    wherein the resin column while unhardened has viscosity within a range from 6000 mPa·s to 30000 mPa·s under room temperature; and
    wherein the resin column after hardened has a dimension within a range from 0.1 mm to 1.0 mm in an optical axis direction.

19. An image forming apparatus according to claim 16,
    wherein the radiator is adjustable relative to the holder at least in an optical axis direction;
    wherein the optical element is adjustable relative to the holder at least in a direction perpendicular to the optical axis direction; and
    wherein the resin column is hardened after the radiator and the optical element are adjusted such that the light beam emergent from the optical element is a substantially parallel bundle of rays at least in a main scanning direction.

20. An image forming apparatus according to claim 16, wherein a condition, $T \geq 0.2 \times D$ is satisfied, in which D is a distance between an end of the radiator and a center of the resin column, and T is a space between the radiator and the holder at the end.

21. A laser scanning device according to claim 1, wherein the resin column is hardened after the radiator holding the light emitting element has been positioned relative to the holder.

22. A laser scanning device according to claim 21, wherein the holder is positioned and fixed in the housing after the resin column has been hardened.

23. An image forming apparatus according to claim 16, wherein the resin column is hardened after the radiator holding the light emitting element has been positioned relative to the holder.

24. An image forming apparatus according to claim 23, wherein the holder is positioned and fixed in the housing after the resin column has been hardened.

25. A method of assembling a laser scanning device including a light emitting element, an optical element for shaping a light beam emitted from the light emitting element, a radiator which holds the light emitting element and is substantially a planar plate extending from a flange of the light emitting element, a holder to which the optical element is fixed, and a deflector for deflecting the light beam which has been emitted from the light emitting element and passed through the optical element, the method comprising:
    locating the holder holding the optical element and the radiator holding the light emitting element with a space there-between;
    connecting the holder and the radiator to each other via at least one resin column so as to keep a space there-between;
    positioning the radiator relative to the holder; and
    hardening the resin column after the radiator has been positioned relative to the holder.

26. A method of assembling a laser scanning device according to claim 25, the laser scanning device further including a housing in which the deflector is fixed, the method further comprising:
    positioning and fixing the holder in the housing after the resin column has been hardened.

* * * * *